United States Patent [19]

Umezawa

[11] Patent Number: 4,679,065

[45] Date of Patent: Jul. 7, 1987

[54] AUTOMATIC WHITE CONTROL CIRCUIT FOR COLOR TELEVISION RECEIVER

[75] Inventor: Toshimitsu Umezawa, Kazo, Japan

[73] Assignee: Kabushiki Kaisha Toshiba, Kawasaki, Japan

[21] Appl. No.: 628,985

[22] Filed: Jul. 9, 1984

[30] Foreign Application Priority Data

Jul. 11, 1983 [JP] Japan ............... 58-124608

[51] Int. Cl.$^4$ .................. H04N 9/64; H04N 9/20; H04N 9/16
[52] U.S. Cl. ........................ 358/29; 358/65; 358/74
[58] Field of Search ......... 358/29, 10, 243, 21 V, 358/168, 34, 171, 74, 65, 170, 139

[56] References Cited

U.S. PATENT DOCUMENTS

| 4,012,775 | 3/1977 | Smith | 358/29 |
|---|---|---|---|
| 4,200,882 | 4/1980 | Janssen | 358/29 |
| 4,340,904 | 7/1982 | Wingrove, Jr. | 358/29 |
| 4,356,508 | 10/1982 | Okada | 358/29 |
| 4,370,674 | 1/1983 | Johnson et al. | 358/74 |
| 4,516,152 | 5/1985 | Willis | 358/29 |

FOREIGN PATENT DOCUMENTS

| 0159088 | 9/1983 | Japan . |
| WO84/00091 | 1/1984 | PCT Int'l Appl. . |
| 1407271 | 9/1975 | United Kingdom . |
| 1503627 | 3/1978 | United Kingdom . |
| 2070398B | 12/1983 | United Kingdom . |

Primary Examiner—James J. Groody
Assistant Examiner—Robert M. Bauer
Attorney, Agent, or Firm—Cushman, Darby & Cushman

[57] ABSTRACT

A color television receiver with automatic reference white control circuit has negative feedback loops for automatically adjusting the amplitude of each cathode driving voltage of R, G and B electron guns, so that the magnitude of each cathode current of R, G and B electron guns is converged to a given value. According to the negative feedback operation, an adjusted reference white becomes insensitive to changes in the cathode emission of CRT due to aging.

7 Claims, 17 Drawing Figures

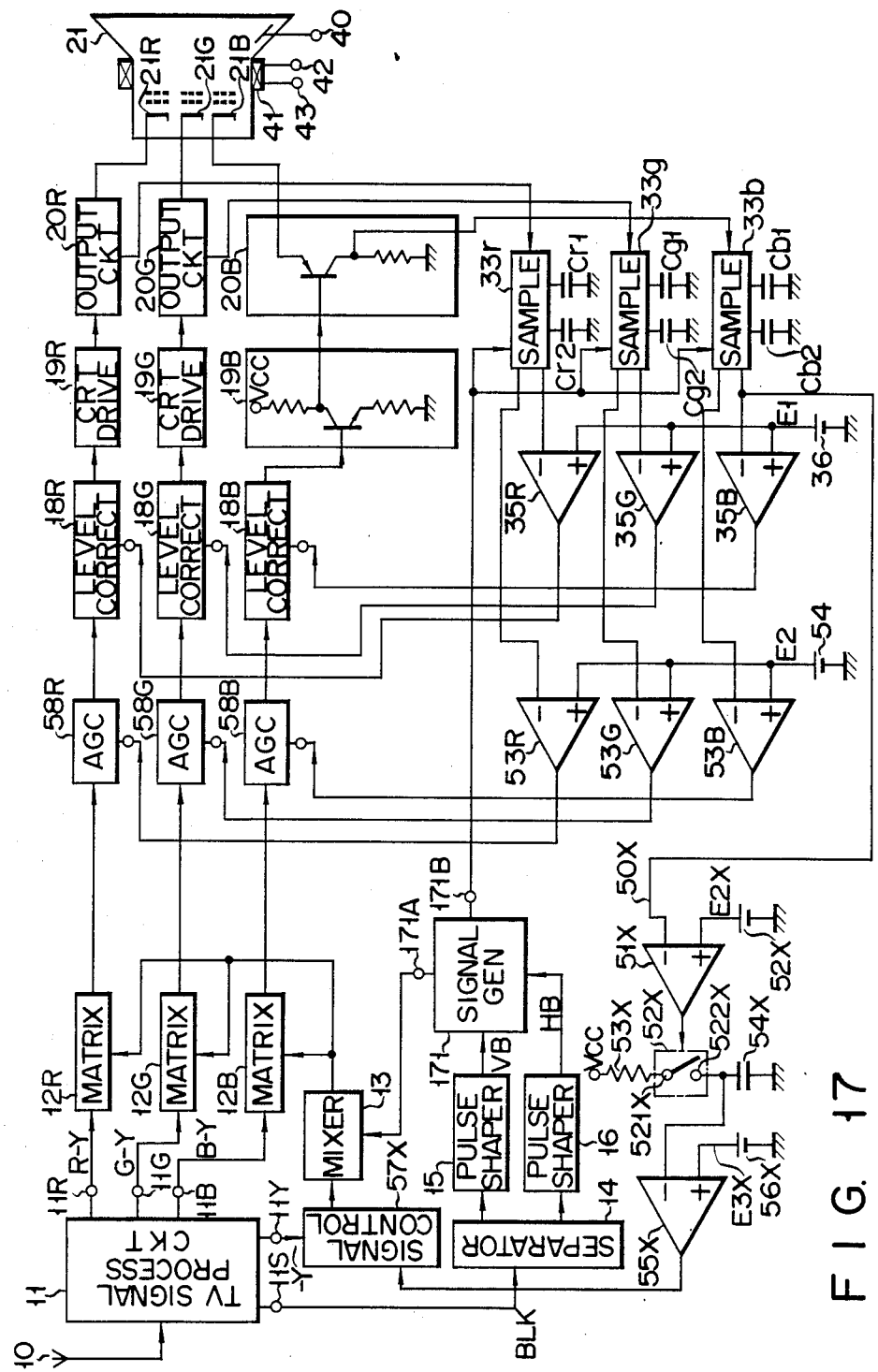
F I G. 17

AUTOMATIC WHITE CONTROL CIRCUIT FOR COLOR TELEVISION RECEIVER

BACKGROUND OF THE INVENTION

The present invention relates to an improvement of a color television receiver having an automatic white control circuit.

In a conventional color television receiver of an NTSC television system, a reference white color temperature of a CRT is set to be 6,774K, for example. The reference white of the color temperature is the basis for color reproduction. Deviation between the CRT reference white color temperature and the color temperature of 6,774K results in a color misregistration between the original color of a photographed object and the color reproduced by the television receiver. Therefore, the reference white must be accurately maintained at a predetermined value.

A color CRT of the color television receiver is driven by red (R), green (G) and blue (B) signal components extracted from a composite color television signal. The CRT drive levels at the R, G and B electron guns in response to the R, G and B signal components must be accurately set at predetermined levels when the reference white is determined. When the drive biases of the respective electron guns deviate from prescribed values, an adverse effect such as a cutoff error (deviation in cutoff level) of the color CRT occurs. The cutoff error is caused by a deteriotation in electron emission of the CRT cathode due to aging and/or caused by a drift of the operating point of associated circuitries. Accordingly, a color television receiver is generally provided with a means for adjusting the bias of CRT to eliminate disadvantages due to the cutoff error.

The above bias adjusting means conventionally includes an electronic circuit with a service switch. The service switch has two switching positions. One is a "service position" and the other is a "normal position". When the service switch selects the service position, the CRT is off-circuited from a video signal and the vertical scanning is stopped. In this state, each cutoff voltage of electron guns of the CRT is set at a given value by adjusting each bias of the electron guns. Then, the CRT is properly cut off at the black level of the video signal, and the relative amplitude ratio among chrominance signals throughout the entire luminance level is properly maintained. When the bias adjustment is completed, gains of CRT drivers coupled to the respective electron guns are adjusted to predetermined values. As a result, the amplitude ratio among the R, G and B drive signals in the normal operation of the CRT becomes optimal.

The above-mentioned adjustment requires skill and experience. It is quite hard for general users to complete the above adjustment at home. When the color television receivers are used for a long period of time, the reference white becomes deviated from the prescribed value, resulting in unnatural color reproduction.

An automatic white control circuit has been recently proposed to automatically adjust the reference white even if a deterioration in the CRT cathode emission and an operating point drift in the associated circuitries occur. A typical example of such a white control circuit is shown in FIG. 1.

Referring to FIG. 1, a reference numeral 10 denotes an antenna. A television signal caught by antenna 10 is fed to a television signal processing circuit 11. Circuit 11 is generally formed of a tuner, PIF circuit, video detector, amplifier, chrominance/luminance separator, sync separator, etc. Color difference signals E11R, E11G and E11B for R-Y, G-Y and B-Y respectively appear at output terminals 11R, 11G and 11B of circuit 11. Signals E11R, E11G and E11B are supplied to matrix circuits 12R, 12G and 12G, respectively.

A video signal including a luminance signal E11Y (−Y) appears at an output terminal 11Y of circuit 11. Signal E11Y is supplied via a mixer 13 to matrix circuits 12R, 12G and 12B. In circuits 12R, 12G and 12B, luminance signal E11Y (−Y) is mixed with color diference signals E11R, E11G and E11B (R-Y, G-Y and B-Y) to produce chrominance signals E12R, E12G and E12B for R, G and B, respectively.

A blanking signal E11S containing blanket pulses BLK appears at an output terminal 11S of circuit 11. Signal E11S is supplied to a pulse separator 14. In separator 14, blanking pulses BLK are separated into a vertical blanking pulse E14V and horizontal blanking pulse E14H. Vertical and horizontal blanking pulses E14V and E14H are supplied to vertical and horizontal blanking pulse shapers 15 and 16, respectively. Shaper 15 supplies a signal E15 containing a wave-shaped vertical blanking pulse VB to a signal generator 17. Shaper 16 supplies a signal E16 containing a wave-shaped horizontal blanking pulse HB to generator 17.

A reference insertion pulse E17A appears at an output terminal 17A of generator 17. Pulse E17A is supplied to mixer 13. In mixer 13, pulse E17A is inserted in a given part, excluding a picture signal interval, of one horizontal period of video signal E11Y. The inserted reference insertion pulse E17A is supplied, together with luminance signal −Y, to matrix circuits 12R, 12G and 12B.

Chrominance signals E12R, E12G and E12B outputted from matrix circuits 12R, 12G and 12B are supplied to cathodes 21R, 21G and 21B of a color CRT 21 via level correction circuits 18R, 18G and 18B, CRT drivers 19R, 19G and 19B, and output circuits 20R, 20G and 20B, respectively. DC levels of output signals E18R, E18G and E18B from circuits 18R, 18G and 18B are increased or decreased according to DC control voltages E35R, E35G and E35B. These voltages E35R, E35G and E35B are respectively supplied to control terminals 22, 23 and 24 of circuits 18R, 18G and 18B.

Hereinafter, CRT drivers 19R, 19G and 19B are represented by CRT driver 19B. CRT driver 19B is formed of an NPN transistor 25. The base of transistor 25 receives signal E18B from level correction circuit 18B. The collector of transistor 25 is coupled via a resistor 26 to a positive voltage source Vcc, and the emitter thereof is circuit-grounded via a resistor 27. An output signal E19B from the collector of transistor 25 is supplied to output circuit 20B. The circuit arrangement of CRT drivers 19R and 19G may be the same as that of CRT driver 19B.

Output circuits 20R, 20G and 20B are similarly represented by output circuit 20B. Output circuit 20B includes a PNP transistor 28 whose base receives signal E19B from the collector of transistor 25. The collector of transistor 28 is circuit-grounded via a resistor 29, and the emitter thereof is connected to cathode 21B of CRT 21. When the current amplification factor $h_{FE}$ of transistor 28 is far larger than "1", a cathode current I21B flowing from cathode 21B into the emitter of transistor 28 is substantially the same as the collector current of transistor 28. In this case, the voltage drop across resistor 29 directly corresponds to the cathode current I21B. Thus, resistor 29 serves as a current detecting resistor. The arrangement of circuits 20R and 20G may be the same as that of circuit 20B.

A signal E20B corresponding to the voltage drop at resistor 29 is supplied to a sampling circuit 33B. Signals E20R and E20G being proportional to cathode currents I21R and I21G of CRT 21 are similarly supplied from circuits 20R and 20G to sampling circuits 33R and 33G, respectively. Circuits 33R, 33G and 33B may be conventional sample/hold circuits. Each of sampling circuits 33R, 33G and 33B receives a gate pulse E17B obtained from an output terminal 17B of signal generator 17. Gate pulse E17B is generated in synchronism with the generation timing of reference insertion pulse E17A (a detailed description regarding the generation timing of E17A and E17B will be made later with reference to the timing chart of FIGS. 2A to 2E).

Sampling circuit 33R samples the DC potential of signal E20R at the duration of reference insertion pulse E17A, and holds the sampled potential to provide a sampling output signal E33R. Sampling circuit 33G samples the DC potential of signal E20G at the duration of pulse E17A, and holds the sampled potential to provide a sampling output signal E33G. Sampling circuit 33B samples the DC potential of signal E20B at the duration of pulse E17A, and holds the sampled potential to provide a sampling output signal E33B.

Sampling output signals E33R, E33G and E33B are supplied to respective negative inputs (−) of comparators 35R, 35G and 35B. Each positive input (+) of comparators 35R, 35G and 35B receives a reference potential E1 from a reference potential source 36. Comparators 35R, 35G and 35B respectively supply DC control voltages E35R, E35G and E35B to control terminals 22, 23 and 24 of level correction circuits 18R, 18G and 18B. Thus, three independent negative feedback control loops for R, G and B are formed. DC control voltages E35R, E35G and E35B from comparators 35R, 35G and 35B increase when the potentials of sampling output signals E33R, E33G and E33B become lower than reference potential E1. Voltages E35R, E35G and E35B decrease when the potentials of signals E33R, E33G and E33B become higher than reference potential E1. DC control voltages E35R, E35G and E35B are converged to certain values by the DC negative feedback operation when the differences between the reference potential E1 and the respective potentials of signals E33R, E33G and E33B become zero.

Incidentally, a high voltage is applied to the anode of CRT 21 via an anode cap 40. Horizontal and vertical deflection currents are supplied via terminals 42 and 43 to a deflection coil 41. Other non-essential parts for the present invention, such as an audio circuit etc., are not illustrated.

The automatic white control circuit of FIG. 1 will operate as follows.

FIG. 2A shows a typical waveform of video signal E11Y from terminal 11Y of television signal processing circuit 11. In FIG. 2A, reference symbol VB denotes a vertical blanking pulse; HB denotes a horizontal blanking pulse; and L denotes a picture signal. FIG. 2B shows a waveform of signal E15 from vertical blanking pulse shaper 15, and FIG. 2C shows a waveform of signal E16 from horizontal blanking pulse shaper 16. Blanking pulses VB and HB shown in FIGS. 2B and 2C are supplied to signal generator 17. Reference insertion pulse E17A shown in FIG. 2D appears at output terminal 17A of signal generator 17. Pulse E17A is generated, excluding the period of picture signal L, within an interval (T1) of horizontal blanking pulse HB. Pulse E17A can be easily obtained by a conventional counter circuit with a proper gate circuit. Pulse E17A (FIG. 2D) is mixed in mixer 13 with video signal E11Y (FIG. 2A), so that a composite signal E13 (FIG. 2E) is obtained. Composite signal E13 is supplied to the respective cathodes of CRT 21 via circuit elements 12, 18, 19 and 20.

In the following description, the operation regarding the blue circuit elements represents each operation of the red, green and blue circuit elements.

Cathode current I21B from cathode 21B of CRT 21 flows into resistor 29 through the emitter-collector path of transistor 28. Resistor 29 provides a voltage drop corresponding to the magnitude of cathode current I21B, and signal E20B having a potential corresponding to the above voltage drop appears at the node between resistor 29 and the collector of transistor 28. Signal E20B is then supplied to sampling circuit 33B. Circuit 33B receives gate pulse E17B in synchronism with the generation (period T1) of reference insertion pulse E17A. Gate pulse E17B determines the timing of sampling and holding operations in circuit 33B. Sampling circuit 33B samples the potential of signal E20B and holds the sampled potential in a capacitor Cb. The sampled and held signal E33B is supplied to the negative input (−) of comparator 35B.

Comparator 35B has a characteristic as shown in FIG. 3. When the reference potential applied to the positive input (+) of comparator 35B is given to be E1 and the input and output potentials of comparator 35B are respectively plotted along the abscissa and ordinate, the output potential (E35B) decreases as the input potential (E33B) increases.

Level correction circuit 18B has such an electrical characteristic that the output DC level of signal E18B raises when DC control voltage E35B applied to control terminal 24 increases, while the output DC level of E18B falls when E35B decreases.

When the emission of cathode 21B is deteriorated (or a certain drift in the operating point of associated circuitries occurs), the corresponding cathode current I21B flowing into resistor 29 of circuit 20B becomes small. The potential of signal E33B from sampling circuit 33B is proportional to the magnitude of cathode current I21B which is obtained at the period of reference insertion pulse E17A (FIG. 2D). Since the sampling is performed only during the period T1 of reference insertion pulse E17A, the potential of signal E33B is independent of the period of picture signal L. Thus, when the deterioration of cathode emission occurs, the sampled output E33B is decreased regardless of the presence of any picture signal L.

Comparator 35B compares reference potential E1 with the potential of sampled output E33B. When a deterioration of the cathode emission occurs, comparator 35B generates DC control voltage E35B which is increased in accordance with the characteristic of FIG. 3. Then, the DC level of signal E18B from level correction circuit 18B is increased, thereby increasing the corresponding cathode current I21B.

On the contrary, when the cathode current increases, operation opposite to the operation described above is performed so as to decrease the corresponding cathode current. The increase/decrease operation point of the negative feedback control is stably converged to a point at which the difference between the reference potential E1 and the sampled output E33B becomes zero.

The cathode emission correction operation for R and G components may be performed in the same manner as that for the B component as described above. When the negative feedback control circuit is arranged to set the difference between the reference potential (E1) and the sampled output (E33) to be zero while the initial reference white is properly adjusted, the CRT biases for R, G, and B are automatically adjusted even if a deterioration in the cathode emission of CRT or a drift in the operating point of associated circuitries occurs. As a result, an automatic correction is so performed that the reference white is always maintained at a predetermined value.

The above operation will be exemplified using the circuit arrangement of the blue axis.

Assume here that the first grid (control grid) of each electron gun of CRT 21 is circuit-grounded, the voltage potential at cathode 21B and the current (I21B) flowing therethrough are respectively represented by uk and ik, and the cutoff voltage of cathode 21B is given to be Vcut. Under this assumption, cathode current ik is given as follows:

$$ik = (K/Vcut^{3/2})(Vcut - uk)^r \tag{1}$$

where K is a proportional constant, and r is a specific constant of the CRT which is determined by the characteristic of the electron gun. Specific constant r generally falls within the range of 2.5 to 3.0.

When the input potential of comparator 35B (i.e, the potential of output E33B from sampling circuit 33B) is denoted by ui and the resistance of resistor 29 is denoted by R, input potential ui with respect to the circuit-ground is given to be:

$$ui = R \cdot ik \tag{2}$$

Further, when the potential of output E35B from comparator 35B is assumed to be uA, the sensitivity of comparator 35B is assumed to be A and the potential of reference potential source 36 is assumed to be E1, the output potential uA is given as:

$$uA = A(E1 - ui) \tag{3}$$

Accordingly, it can be seen than comparator 35B is a difference amplifier with a gain of A. When the potential of the signal component of reference insertion pulse E17A supplied to level correction circuit 18B is assumed to be VT1, the DC control sensitivity of circuit 18B is assumed to be B and the potential of output E18B from circuit 18B is assumed to be uB, the output potential uB is given as:

$$uB = VT1 + B \cdot uA \tag{4}$$

Furthermore, when the collector potential of transistor 25 is assumed to be uc, the resistance of resistor 27 is assumed to be R1, a resistance of resistor 26 is assumed to be R2 and the potential of voltage source Vcc is given to be Vcc, the collector potential uc is given as follows:

$$uc = Vcc - (R2/R1)(uB - VBE1) \tag{5}$$

where VBE1 denotes the base-emitter voltage of transistor 25. Potential uc is applied to cathode 21B via the base-emitter path of transistor 28.

A cathode potential uk at cathode 21B of CRT 21 is given as:

$$uk = uc + VBE2 \tag{6}$$

where VBE2 is the base-emitter voltage of transistor 28.

When equations (2) to (5) are substituted into equation (6), the following equation is obtained:

$$uk = Vcc + VBE2 - (R2/R1)\{VT1 + A \cdot B(E1 - R \cdot ik) - VBE1\} \tag{7}$$

Equation (7) is substituted into equation (1), so that $$\begin{aligned}ik &= (K/Vcut^{3/2})[Vcut - Vcc - VBE2 + (R2/R1) \times \\ &\quad \{VT1 + A \cdot B(E1 - R \cdot ik) - VBE1\}]^r \\ &= (K/Vcut^{3/2})[Vcut - (Vcc + VBE2 + (R2/R1) \times \\ &\quad VBE1) + (R2/R1)\{VT1 + A \cdot B(E1 - R \cdot ik)\}]^r\end{aligned} \tag{8}$$

If $$Vcut - \{Vcc + VBE2 + (R2/R1)VBE1\} = \Delta V \tag{9}$$

then equation (8) can be rewritten as follows:

$$ik = (K/Vcut^{3/2})[\Delta V + (R2/R1)\{VT1 + A \cdot B(E1 - R \cdot ik)\}]^r \tag{10}$$

In equation (9), Vcut, Vcc, VBE1, VBE2 and R2/R1 are all constants. Accordingly, a circuit design for the configuration of FIG. 1 enables the value of $\Delta V$ in equation (9) to be zero, that is, $$\Delta V = 0 \tag{9'}$$

Then, equation (10) can be rewritten as:

$$ik = (K/Vcut^{3/2})[(R2/R1)\{VT1 + A \cdot B(E1 - R \cdot ik)\}]^r \tag{11}$$

The cathode current ik, which nullifies the difference between input potential ui and reference potential E1 at comparator 35B, is given to be:

$$ik = E1/R$$

The above equation is substituted into the right term of equation (11), so that $$ik = (K/Vcut^{3/2})\{(R2/R1)VT1\}^r \tag{12}$$

Therefore, $$ik = E1R = (K/Vcut^{3/2})\{(R2/R1)VT1\}^r$$

The above equation may be rewritten as follows:

$$E1 = R \cdot (K/Vcut^{3/2})\{(R2/R1)VT1\}^r \tag{13}$$

When circuit constants VT1, Vcc, E1 and so on are selected so that equation (9') and E1 satisfy the relation of equation (13), the equation (8) holds. A current (ik)T1 flowing during the sampling period T1 (FIG. 2D) is stabilized at the following value:

$$(ik)T1 = E1/R = (Ik)T1 \tag{14}$$

where Ik denotes the stabilized value of cathode current ik.

Meanwhile, cutoff voltage Vcut of the electron gun of CRT 21 depends on the spatial distance between the first and second grids. Variations in the spatial distance during the fabrication of CRTs bring unfavorable variations in cutoff voltage Vcut. When equation (13) is satisfied and a variation in Vcut is given to be ΔVcut, ΔV of equation (9) is given as:

$$\Delta V = Vcut + \Delta Vcut - \{Vcc + VBE2 + (R2/R1)VBE1\} \quad (15)$$

Upon the assumption of equation (9'), $$Vcut - \{Vcc + VBE2 + (R2/R1)VBE1\} = 0$$

so that equation (15) is rewritten as ΔV=ΔVcut. Current (ik)T1 flowing during the sampling period T1 is derived from equation (10) and it satisfies the following equation:

$$(ik)T1 = \{(K/(Vcut + \Delta Vcut)^{3/2}\}[\Delta Vcut + (R2/R1) \times \quad (16)$$
$$\{VT1 + A \cdot B(E1 - R \cdot (ik)T1)\}]^r$$

In this case, if a current error (which indicates a deviation from the target value of the cathode current) is given to be (Δik)T1, a relation $(ik)T1 = (Ik)T1 + (\Delta ik)T1$ is obtained. According to equation (16), the right term of the above relation is given as:

$$(Ik)T1 + (\Delta ik)T1 = \{(K/(Vcut + \Delta Vcut)^{3/2}\}[\Delta Vcut +$$
$$(R2/R1) \times \{VT1 + A \cdot B(E1 - R \cdot (Ik)T1 -$$
$$R \cdot (\Delta ik)T1)\}]^r$$
$$= \{(K/(Vcut + \Delta Vcut)^{3/2}\}[\Delta Vcut +$$
$$(R2/R1)VT1 + (R2/R1)\{A \cdot B(E1 - R \cdot (Ik)T1\} - (R2/R1) \times$$
$$\{A \cdot B \cdot R(\Delta ik)T1\}]^r$$

A relation $E1 - R \cdot (ik)T1 = 0$ is obtained from equation (14), so that $$(Ik)T1 + (\Delta ik)T1 = \{(K/(Vcut + \Delta Vcut)^{3/2}\}[\Delta Vcut + \quad (17)$$
$$(R2/R1)VT1 - (R2/R1) \times \{A \cdot B \cdot R(\Delta ik)T1\}]^r$$

if Vcut>>ΔVcut is satisfied and equation (17) is given to be $$\Delta Vcut = (R2/R1)\{A.B.R(\Delta ik)T1\}$$

then $$(ik)T1 + (\Delta ik)T1 = (K/Vcut^{3/2})\{(R2/R1)VT1\}^r$$

Therefore, when the feedback control loop is arranged to satisfy the following inequality:

$$(R2/R1)A.B.R >> \Delta Vcut/(\Delta ik)T1 \quad (18)$$

the current flowing during the sampling period T1 is kept substantially constant.

The circuit arrangement of FIG. 1 described above has the following disadvantage.

Assume that the voltage of a video signal is given to be u, that the cathode current with cutoff voltage Vcut is given to be ik, that the cathode current with cutoff voltage (Vcut+ΔVcut) is given to be ik', and that the voltage of a video signal with cutoff voltage (Vcut+ΔVcut) is given to be u+ΔVT1, then cathode currents ik and ik' are given as follows:

$$ik = (K/Vcut^{3/2})\{(R2/R1)u\}^r \quad (19)$$

$$ik' = \{K/(Vcut + \Delta Vcut)^{3/2}\}[(R2/R1)(u + \Delta VT1)]^r \quad (20)$$

Therefore, the ratio of ik' to ik is given as:

$$ik'/ik = \{Vcut/Vcut + \Delta Vcut)\}^{3/2} \times \{(u + \Delta VT1)/u\}^r \quad (21)$$

It is apparent that the reference white of a CRT can be fixed at a prescribed constant value when the right term of equation (21) is constant. However, it is very hard to keep the value of the right term of equation (21) constant. This is because the right term of equation (21) cannot be made constant unless a condition that ΔVcut=0 (and ΔVT1=0) is satisfied. Only under this condition, does ik'/ik become constant. As previously described, cutoff voltage Vcut varies during the fabrication process of CRTs. It is almost impossible in practice to establish ΔVcut=0. Thus, a color television receiver is subjected to the variation ΔVcut, and the reference white cannot be kept constant throughout all levels (black level to white level) of the video signal.

The above problem of the prior art will be described with reference to the graphs shown in FIGS. 4 and 5. Referring to FIG. 4, voltage u of the video signal is plotted along the abscissa, and the change in ratio ik'/ik in accordance with variation ΔVcut is plotted along the ordinate. Each of curves A and B represents a change in ratio ik'/ik when variation ΔVcut occurs in the negative side with respect to Vcut (here the change of curve A in the negative side is greater than that of curve B). Each of curves D and E represents a change in ratio ik'/ik when variation Vcut occurs in the positive side with respect to Vcut (here the change of curve E in the positive side is greater than that of curve D). Curve C represents a desired ratio of ik'/ik obtained when ΔVcut=0.

As is apparent from FIG. 4, ik'/ik=1 is obtained (i.e., ratio ik'/ik becomes constant) only when ΔVcut=0. Ratio ik'/ik deviates from the center value of 1.0 according to the changes in variation ΔVcut. For instance, when the video signal voltage is set at u1 in FIG. 4, ratio ik'/ik =1.1 is obtained. When the video signal voltage is set at VT1 (i.e., when the video signal voltage is represented by the voltage of reference insertion pulse E17A during the sampling period T1), ik'/ik=1 (constant) is obtained regardless of the change in ΔVcut. In other words, when the voltage of the video signal is identical with VT1, the reference white is fixed at a constant value. Otherwise, the reference white deviates from a target value, except for ik'/ik=1.0.

The deviation of the reference white will be discussed with reference to the chromaticity diagram of FIG. 5. Line f in FIG. 5 indicats a deviation in reference white of curve A in FIG. 4. Assume that R, G and B cathode currents are given by equations (19) and (20) and are respectively represented by iR, iG and iB which have a specific ratio (iR:iG:iB=1:1:1) so as to obtain the reference white W. The reference white is obtained only when the relation u=VT1 in FIG. 4 is established. For instance, when u=u1 as shown in FIG. 4 is considered, the current ratio is given to be:

Then, the current ratio changes. The deviation in the reference white due to this change is represented by line f in FIG. 5.

In the course of the circuit design of a color television receiver, it is almost impossible to ensure that the reference white comes to be constant for all actual CRTs, unless the values of respective elements such as voltages and resistances in the associated circuit arrangement are carefully determined in consideration of variations in the respective CRTs. Thus, the reference white is deviated in actual commercial products due to changes in the video signal level.

SUMMARY OF THE INVENTION

It is accordingly the object of the present invention to provide a color television receiver which can reproduce a picture with normal colors even if variations in the characteristic of a color CRT are caused by variations in the fabrication process of CRTs.

To achieve the above object, a color television receiver of the invention is provided with special negative feedback loops for automatically adjusting the amplitude of each cathode driving voltage of R, G and B electron guns, so that the magnitude of each cathode current of R, G and B electron guns is converged to a given value.

According to the present invention, important and time-consuming reference white adjustment in the fabrication process of color television receivers can be simplified and stabilized by the operation of the special negative feedback loops. Further, according to the negative feedback operation, the adjusted reference white becomes insensitive to changes in the cathode emission of CRT due to aging etc. From this, even after the distribution of color television receivers to users, disadvantages (e.g., degradation of color reproduction fidelity) due to deviations in reference white can be automatically removed. Therefore, users can enjoy a good picture with normal color for a long time, without periodical reference white adjustment.

BRIEF DESCRIPTION OF THE DRAWINGS

FIG. 17 shows a color television receiver according to another embodiment of the present invention, which corresponds to the combination of the disclosures of Japanese Patent Application Nos. 58-124607 and No. 58-124608 (both filed on July 11, 1983).

DETAILED DESCRIPTION OF THE PREFERRED EMBODIMENTS

Figure 6:
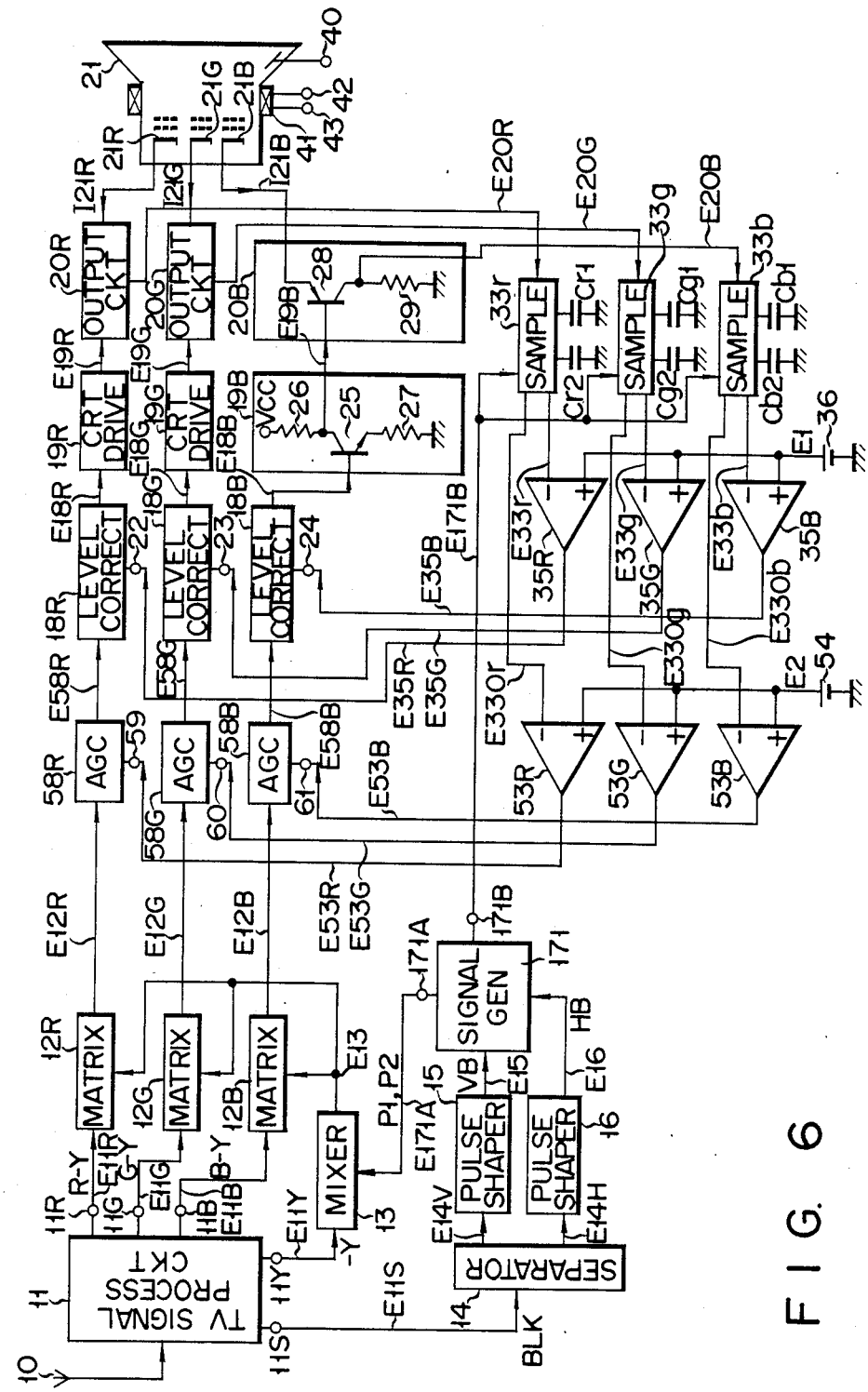
FIG. 6 shows a color television receiver according to an embodiment of the present invention.

A color television receiver according to the present invention will be described with reference to FIGS. 6 to 17. FIG. 6 is a block diagram of the color television receiver according to the present invention. The same reference numerals used in FIG. 6 denote the same parts as in FIG. 1, and a detailed description thereof will be omitted for the sake of simplicity.

The following description will be given chiefly to the key portion of the present invention. The function of a signal generator 171 is different from that of signal generator 17 in FIG. 1. The function of signal generator 171 will be described with reference to FIGS. 7A to 7G. Signals shown in FIGS. 7A to 7C are the same as those in FIGS. 2A to 2C, respectively. Signal generator 171 is arranged to generate not only a first reference insertion pulse P1 during a period T1 but also a second reference insertion pulse P2 during a period T2, as shown in FIG. 7D. Second reference insertion pulse P2 is generated within period T2 which is, e.g., delayed by 1 H from period T1 in the horizontal blanking (HB) period. The amplitude of second reference insertion pulse P2 is different from (larger than in this case) the amplitude of first reference insertion pulse P1. When the amplitude of pulse P1 corresponds to the condition that u=VT1 in FIG. 4, the amplitude of pulse P2 corresponds to the condition that, e.g., u=u1.

According to the present invention, the fact that the amplitude of P1 is different from the amplitude of P2 is important. That is, when pulse P1 is used to determine the condition u=VT1, pulse P2 is used to converge the value ik'/ik=1.1 on curve A in FIG. 4 to the value ik'/ik=1.0 on curve C. A reference insertion pulse E171A containing first and second reference insertion pulses P1 and P2 are supplied from an output terminal 171A of generator 171A to mixer 13. A gate pulse E171B containing first and second gate pulses GP1 and GP2 (FIGS. 7E and 7F) is obtained from an output terminal 171B of generator 171. The generation timing of gate pulses GP1 and GP2 is identical to or synchronized with the generation timing of insertion pulses P1 and P2.

Figure 1:
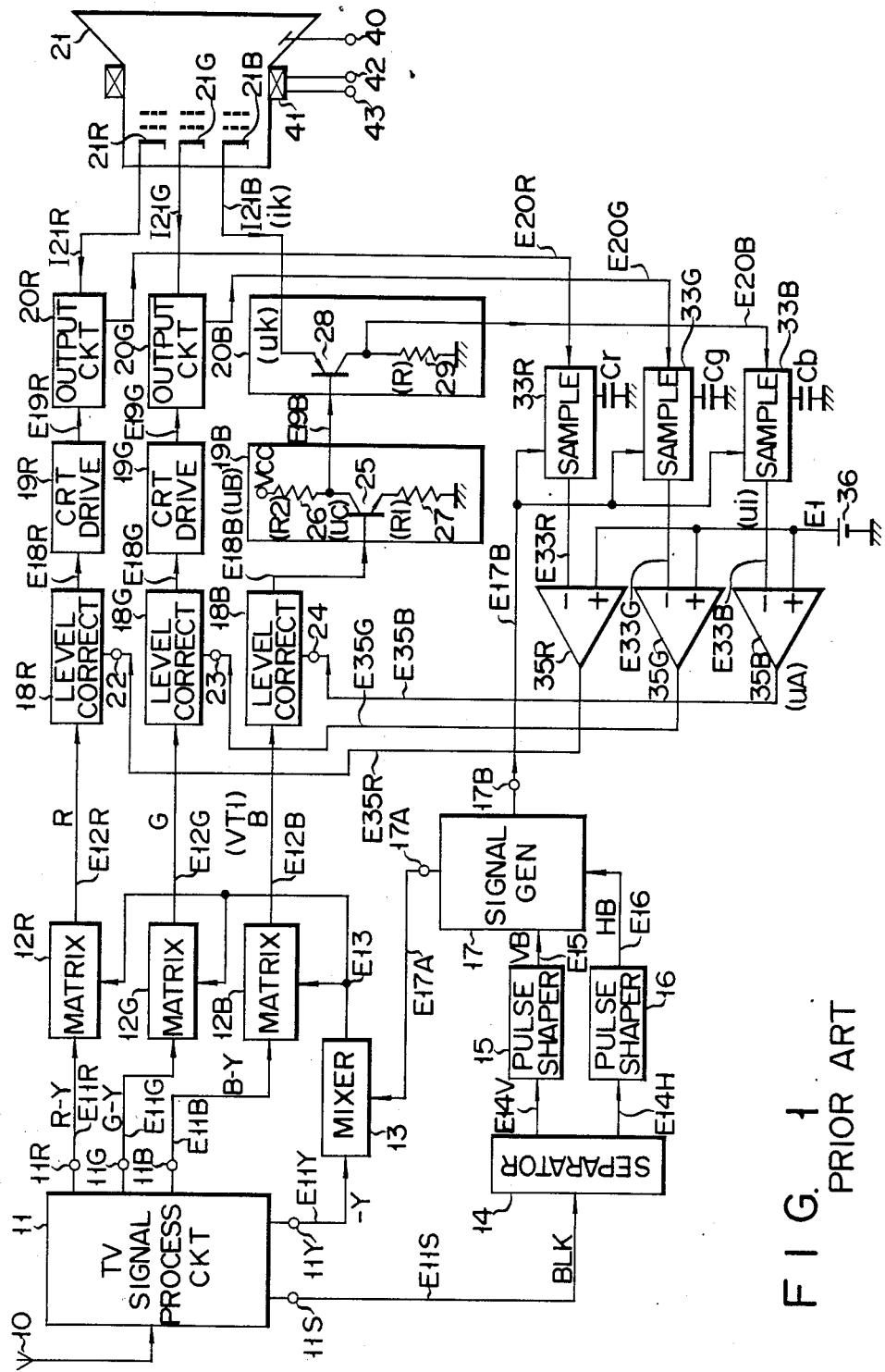
FIG. 1 shows a prior art color television receiver having an automatic white control circuit.
Figure 2:
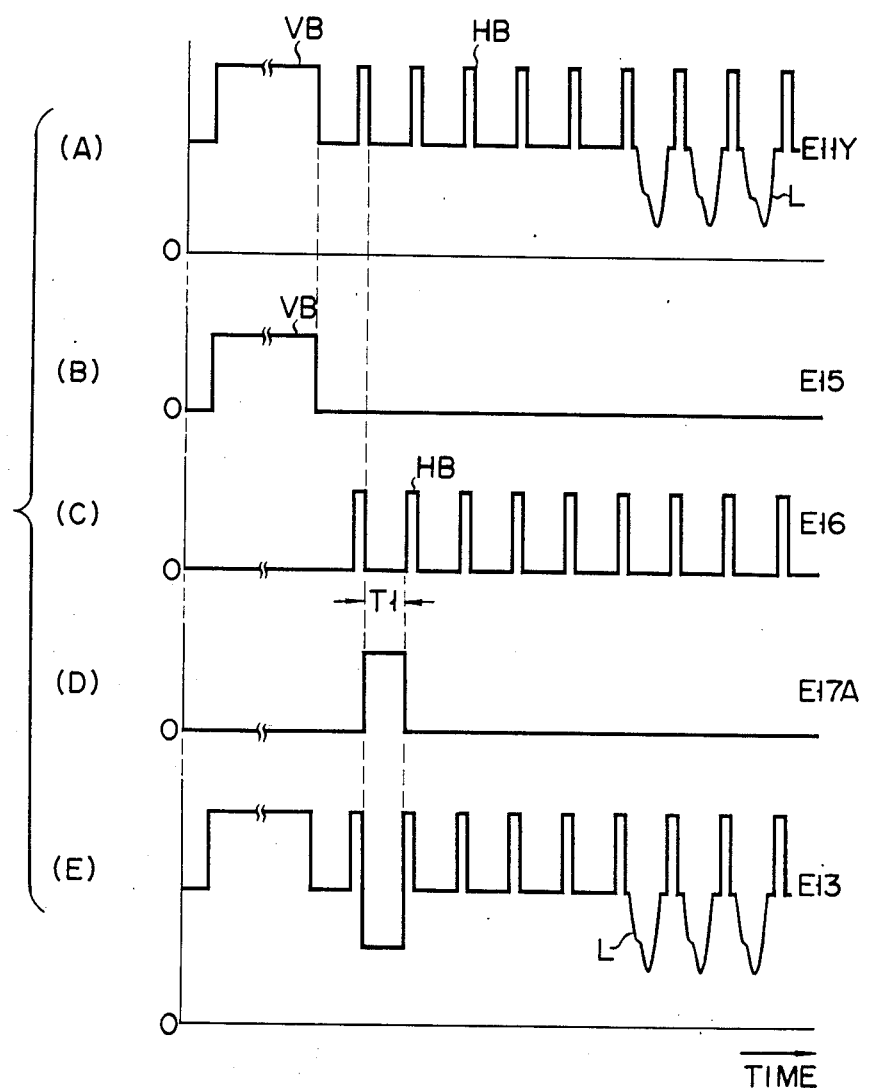
FIGS. 2A to 2E are timing charts showing signals generated from the circuit components of FIG. 1.
Figure 3:
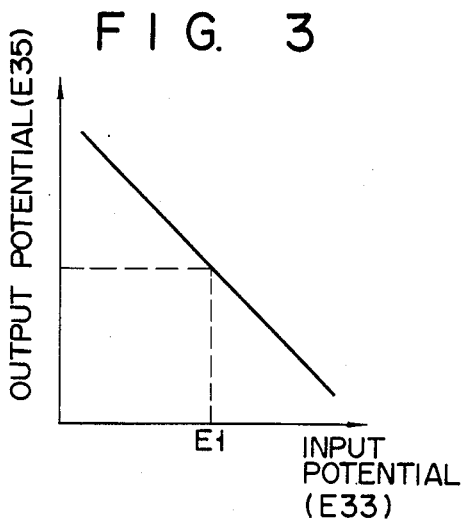
FIG. 3 shows an operation characteristic of each comparator used in the circuit of FIG. 1.

Sampling circuits 33r, 33g and 33b respectively correspond to two sets of sampling circuits 33R, 33G and 33B in FIG. 1. Each of circuits 33r, 33g and 33b samples and holds the potential of corresponding signals E20R, E20G and E20B according to gate pulse E171B from signal generator 171. The sampled potentials of signals E20R, E20G and E20B respectively correspond to the magnitudes of cathode currents I21R, I21G and I21B during the durations of first and second insertion pulses P1 and P2. Capacitors Cr1, Cg1 and Cb1 hold the sampled potentials during the period T1 of pulse P1. Capacitors Cr2, Cg2 and Cb2 hold the sampled potentials during the period T2 of pulse P2.

Sampled outputs E33r, E33g and E33b obtained during the period of first reference insertion pulse P1 are supplied to the respective negative inputs (−) of comparators 35R, 35G and 35B. Each positive input (+) of comparators 35R, 35G and 35B receives a first reference potential E1 from a first potential source 36. Outputs E35R, E35G and E35B from comparators 35R, 35G and 35B are respectively supplied to the control terminals 22, 23 and 24 of level correction circuits 18R, 18G and 18B.

Elements 18 to 20, 33 and 35 in FIG. 6 form DC negative feedback control loops for controlling the cathode biases of R, G and B electron guns in CRT 21. These control loops serve to equivalently shift each cutoff voltage Vcut (DC) of the R, G and B electron guns to a specific value which is determined by the reference potential E1 and which corresponds to the point u=VT1 in FIG. 4.

Sampled outputs E330r, E330g and E330b obtained during the period of second reference insertion pulse P2 are supplied to the respective negative inputs (−) of comparators 53R, 53G and 53B. Each positive input (+) of comparators 53R, 53G and 53B receives a second reference potential E2 from a second potential source 54. Outputs E53R, E53G and E53B from comparators 53R, 53G and 53B are respectively supplied to control input terminals 59, 60 and 61 of AGC amplifiers 58R, 58G and 58B. AGC amplifiers 58R, 58G and 58B are arranged between matrix circuits 12R, 12G and 12B and level correction circuits 18R, 18G and 18B, respectively.

Figure 8:
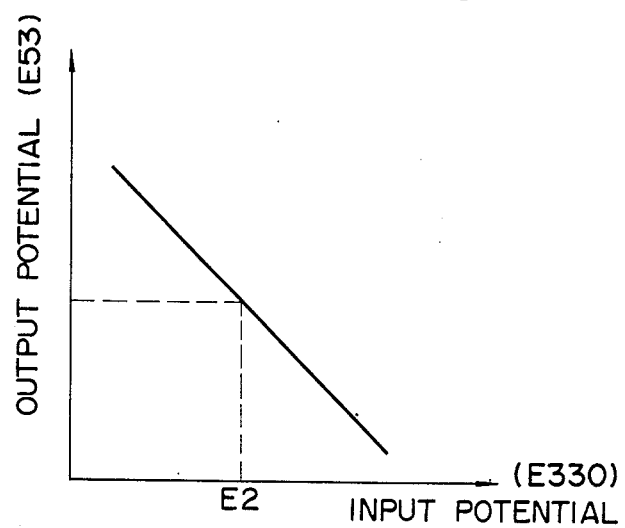
FIG. 8 shows an operation characteristic of each of comparators 53R, 53G and 53B used in the embodiment of FIG. 6.

The input/output characteristic of each of comparators 53R, 53G and 53B is shown in FIG. 8. In FIG. 8, the reference potential applied to the respective positive inputs (+) of comparators 53R, 53G and 53B is given to be E2, the input potential (E330) applied to the respective negative inputs (−) of these comparators is plotted along the abscissa, and the output voltage (E53) of these comparators is plotted along the ordinate. Thus, the output voltage (E53) of these comparators decreases when the input voltage (E330) increases, while the output voltage (E53) increases when the input voltage (E330) decreases.

Figure 9:
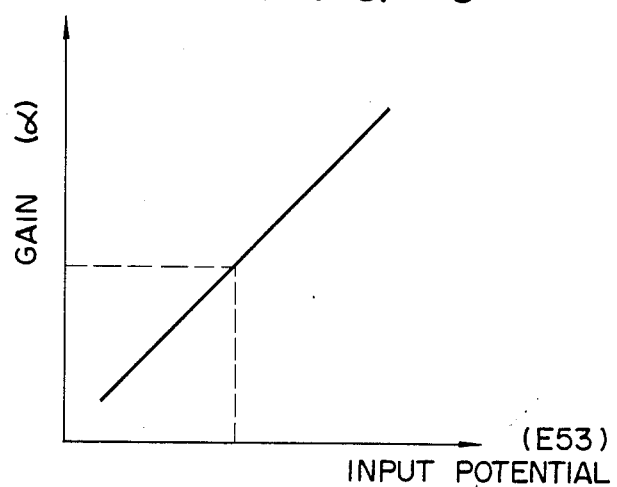
FIG. 9 shows an operation characteristic of each of AGC amplifiers 58R, 58G and 58B used in the embodiment of FIG. 6.
Figure 10:
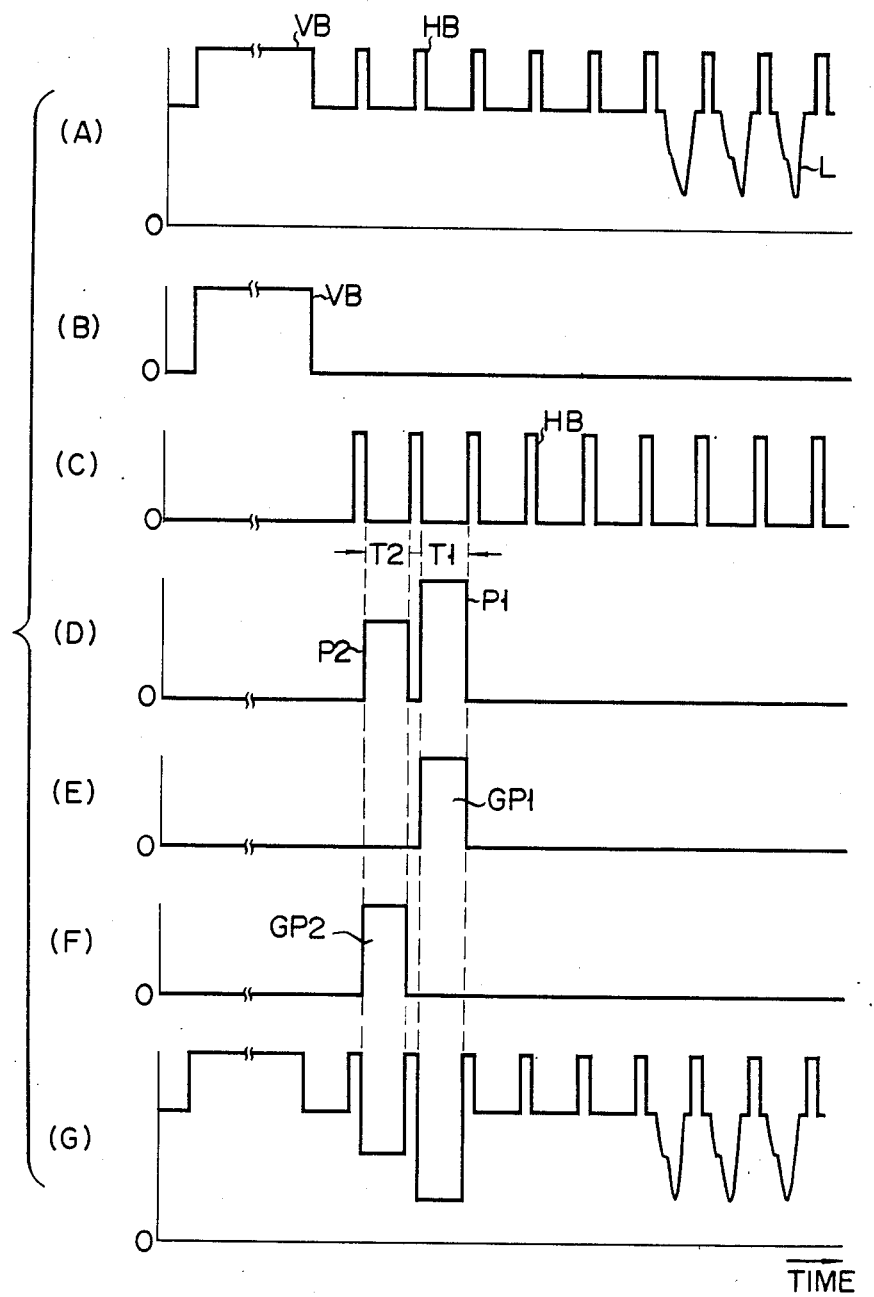
FIGS. 10A to 10G are timing charts explaining another operation of the embodiment in FIG. 6.
Figure 11:
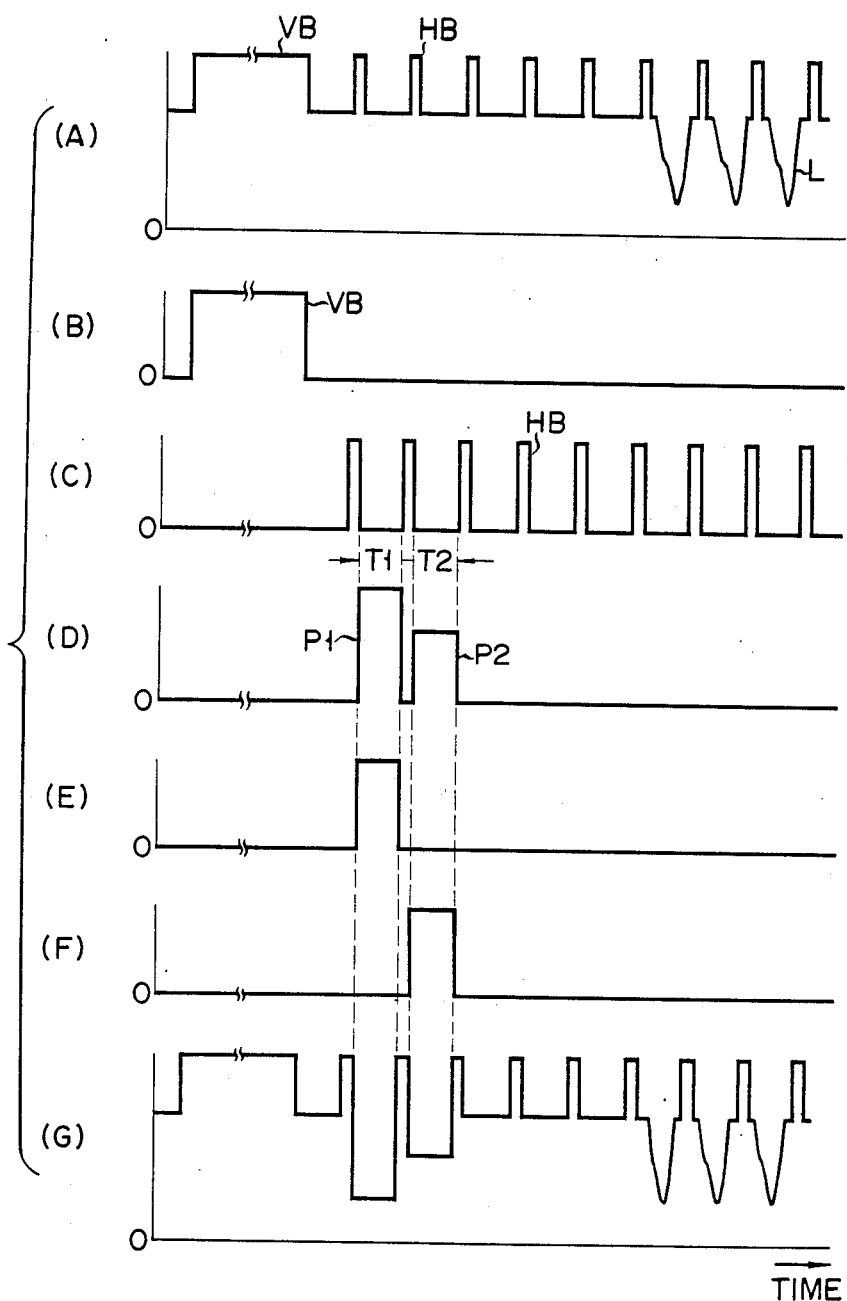
FIGS. 11A to 11G are timing charts explaining still another operation of the embodiment in FIG. 6.

Each of AGC amplifiers 58R, 58G and 58B has an input/output characteristic as shown in FIG. 9. In FIG. 9, DC control voltages (E53) applied to control input terminals 59, 60 and 61 of AGC amplifiers 58R, 58G and 58B are plotted along the abscissa. The gain α of each of AGC amplifiers 58R, 58G and 58B is plotted along the ordinate. When signals E12R, E12G and E12B are respectively inputted to AGC amplifiers 58R, 58G and 58B, amplifiers 58R, 58G and 58B provide outputs E58R, E58G and E58B whose voltages (amplitudes) respectively correspond not only to the amplitudes of signals E12R, E12G and E12B but also to the potentials of DC control voltages E53R, E53G and E53B. The higher the potential of control voltage (E53) becomes, the higher the amplitude of output voltage (E58) becomes. When the control voltage (E53) decreases, the output voltage (E58) decreases.

Elements 58, 18 to 20, 33 and 53 in FIG. 6 form AC negative feedback control loops for controlling the cathode driving voltages of the R, G and B electron guns in CRT 21. These control loops serve to converge each of cathode currents I21R, I21G and I21B (whose magnitudes respectively correspond to the amplitudes (AC) of signals E12R, E12G and E12B) of the R, G and B electron guns to a specific value which is determined by the reference potential E2.

Figure 7:
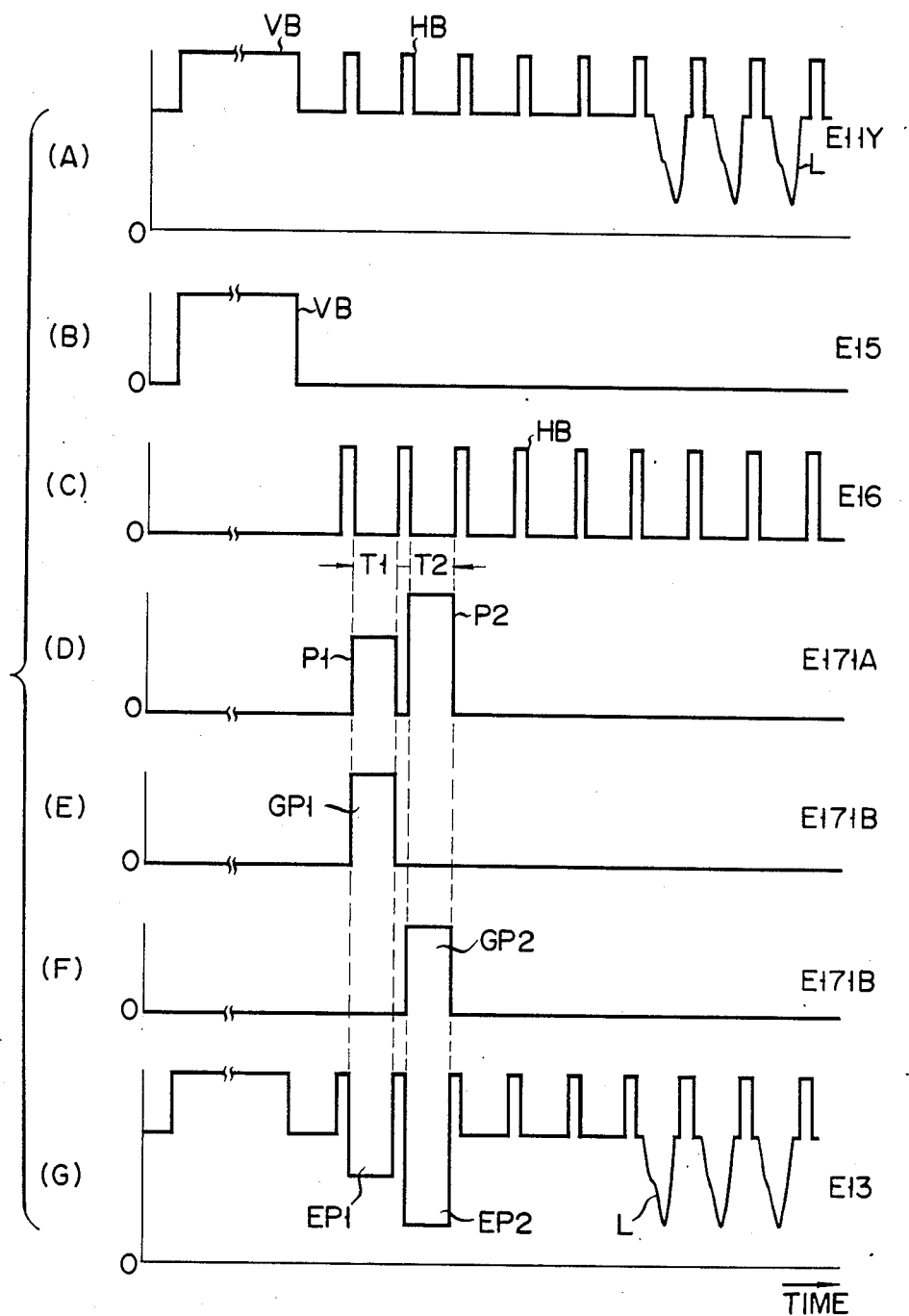
FIGS. 7A to 7G are timing charts explaining a typical operation of the embodiment shown in FIG. 6.

The operation of the circuit shown in FIG. 6 will be described with reference to FIGS. 7 to 9. FIG. 7A shows video signal E11Y appearing at output terminal 11Y of television signal processing circuit 11; FIG. 7B shows output E15 from vertical blanking pulse shaper 15; and FIG. 7C shows output E16 from horizontal blanking pulse shaper 16. These signals E11Y, E15 and E16 are similar to those in FIGS. 2A to 2C. FIG. 7D shows reference insertion pulse E171A containing first and second reference insertion pulses P1 and P2 which appear at terminal 171A of signal generator 171. Pulses P1 and P2 are mixed in mixer 13 with video signal E11Y of FIG. 7A. Mixer 13 outputs a composite video signal E13 as shown in FIG. 7G. In FIG. 7G, the bottom potentials of signal components EP1 and EP2 respectively correspond to the top potentials of reference insertion pulses P1 and P2. FIGS. 7D and 7E respectively show gate pulses GP1 and GP2 obtained from terminal 171B of signal generator 171.

The potentials of signals E20R, E20G and E20B corresponding to the cathode currents I21R, I21G and I21B of CRT 21 during period T1 are sampled and held in sampling circuits 33r, 33g and 33b. Sampled outputs E33r, E33g and E33b are respectively supplied to comparators 35R, 35G and 35B and are compared with first reference potential E1. Level correction circuits 18R, 18G and 18B are controlled in accordance with the potentials of comparison outputs E35R, E35G and E35B from comparators 35R, 35G and 35B. The DC negative feedback operation of elements 18, 19, 20, 33 and 35 in FIG. 6 is the same as that in FIG. 1. However, according to the embodiment of the present invention, sampling circuits 33r, 33g and 33b are further operated during period T2 after period T1. After period T1, comparators 53R, 53G and 53B and AGC amplifiers 58R, 58G and 58B are actuated. The AC negative feedback operation of elements 58, 18 to 20, 33 and 53 will be explained below using the circuit elements of the blue axis.

As previously described, the amplitude of second reference insertion pulse P2 in period T2 is greater than that of first reference insertion pulse P1 in period T1. Namely, the amplitude of second reference insertion pulse P2 represents brighter white than the brightness of first reference insertion pulse P1. The potential of signal E20B which corresponds to cathode current I21B flowing during the period T2 is sampled in sampling circuit 33b, and the sampled output E330b is supplied to the negative input (−) of comparator 53B.

Reference potential E2 applied to the positive input (+) of comparator 53B is determined according to the following manner. Here, consideration will be given to a case wherein an error as indicated by the said equation (21) occurs, said equation (21) is:

$$ik'/ik = \{Vcut/Vcut + \Delta Vcut)\}^{3/2} \times \{(u + \Delta VT1)/u\}^r$$

The potential E2 of potential source 54 is preset such that the potential at the negative input (−) of comparator 53B, which is obtained when ik'/ik=1.0 is established (i.e., when cutoff voltage Vcut is stabilized), becomes equal to the potential at the positive input (+) of comparator 53B. From this, if ik'/ik=1.0, no potential difference appears between the inputs (+) and (−) of comparator 53B, and output E53B from comparator 53B becomes constant. Then, the gain of AGC amplifier 58B is converged to 1.0, and output E58B from amplifier 58B is also kept constant. In other words, the reference white is kept constant throughout all levels from the black level to the white level.

When variations in the fabrication process of CRT 21 cause variations in cutoff voltage Vcut of electron guns so as to generate the deviation ΔVcut (e.g., ik'/ik>1.0), cathode current I21B increases during period T2 so that sampled output E330b from sampling circuit 33b is increased. Then, sampled output E330b exceeds reference potential E2, and output E53B from comparator 53B is decreased in accordance with the characteristic as shown in FIG. 8. A decrease in output E53B from comparator 53B is equal to a decrease in control input of AGC amplifier 58B. Thus, the input-to-output gain of AGC amplifier 58B becomes small so that the drive voltage applied to cathode 21B of CRT 21 is decreased. Therefore, ik'/ik is controlled to approach the stabilized value of 1.0.

However, if ik'/ik<1.0, sampled output E330b from sampling circuit 33b is decreased, and output E53B from comparator 53B is increased. The gain of AGC amplifier 58B is increased to increase the drive voltage applied to cathode 21B of CRT 21. Even where ik'/ik≃1.0, comparator 53B and AGC amplifier 58B carry out the control operation to constantly maintain the relation ik'/ik=1.0.

The above operation will be described using mathematical expressions. When the cathode current flowing during the period T2 is given to be ik2, input potential ui2 applied to sampling circuit 33b is given as follows:

$$ui2 = R \cdot ik2 \quad (22)$$

When the sensitivity of comparator 53B and the reference potential are given to be a and E2, respectively, output potential uA2 from comparator 53B is given as follows:

$$uA2 = a(E2 - ui2) \quad (23)$$

When the control sensitivity of AGC amplifier 58B is given to be D, the input voltage applied to level correction circuit 18B is given to be VT2, the control sensitivity of level correction circuit 18B is given to be B, the output potential from comparator 35B is given to be uA, then an output potential uB2 from level correction circuit 18B is given as:

$$uB2 = VT2(1 + D \cdot uA2) + B \cdot uA \quad (24)$$

Cathode currents ik1 and ik2 flowing during periods T1 and T2 can be obtained from equations (1) to (10) as:

$$ik1 = (K/Vcut^{3/2})[\Delta V + (R2/R1)\{VT1(1 + \quad (25)$$
$$a \cdot D(E2 - R \cdot ik2)) + A \cdot B(E1 - R \cdot ik1)\}]^r$$

$$ik2 = (K/Vcut^{3/2})[\Delta V + (R2/R1)\{VT2(1 + \quad (26)$$

-continued
$$a \cdot D(E2 - R \cdot ik2)) + A \cdot B(E1 - R \cdot ik1)\}]^r$$

When circuit constants E2, VT2, etc. are selected such that reference potential E2 satisfies the following equation (27) in the same manner as in equation (13), equations (25) and (26) hold.

$$E2 = R(K/Vcut^{3/2})\{(R2/R1)VT2\}^r \quad (27)$$

When equations (25) and (26) hold, currents (ik)T1 and (ik)T2 flowing during the sampling periods T1 and T2 are respectively stabilized at the following values:

$$(ik)T1 = E1/R = (IK)T1 \quad (28)$$

$$(ik)T2 = E2/R = (IK)T2 \quad (29)$$

When cutoff voltage Vcut varies due to deviations in the fabrication process of CRT 21, equation (20) can be rewritten in the embodiment as:

$$ik' = \{K/(Vcut+\Delta Vcut)^{3/2}\}[(R2/R1).\alpha.(u+VT1)]^r \quad (30)$$

where α denotes the input-to-output gain of AGC amplifier 58B. Ratio ik'/ik is thus given as follows:

$$ik'/ik = \{Vcut/(Vcut+\Delta Vcut)\}^{3/2} \times [\alpha.\{(u+\Delta VT1)/u\}]^r \quad (31)$$

As seen from the characteristic of FIG. 9, gain α of AGC amplifier 58B in equation (31) is controlled by the potential of output E53B from comparator 53B. Thus, a gain control is performed so as to obtain the relation ik'=ik.

In equation (31), ik'/ik=1.0 is obtained for u=VT1 and u=VT2. When VT1≠VT2 (e.g., VT2>VT1), the gain α can be calculated as follows:

$$\alpha = \{(Vcut+\Delta Vcut)/Vcut\}^{3/2r} \quad (32)$$

In this case, VT1 becomes zero, and equation (31) is given as:

$$ik'/ik = 1.0 \quad (33)$$

The reference white is thus constant throughout all levels (from black level to white level) of the video signal.

Figure 4:
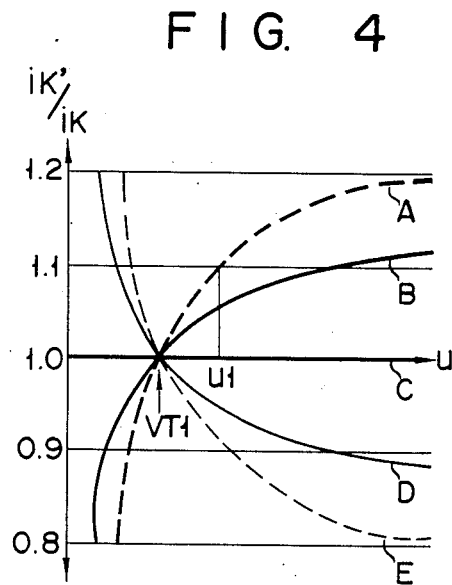
FIG. 4 shows a graph explaining the problem of prior art, wherein the voltage u of a video signal is plotted along the abscissa and the change in ratio ik'/ik in accordance with the cutoff voltage variation $\Delta$Vcut is plotted along the ordinate.
Figure 5:
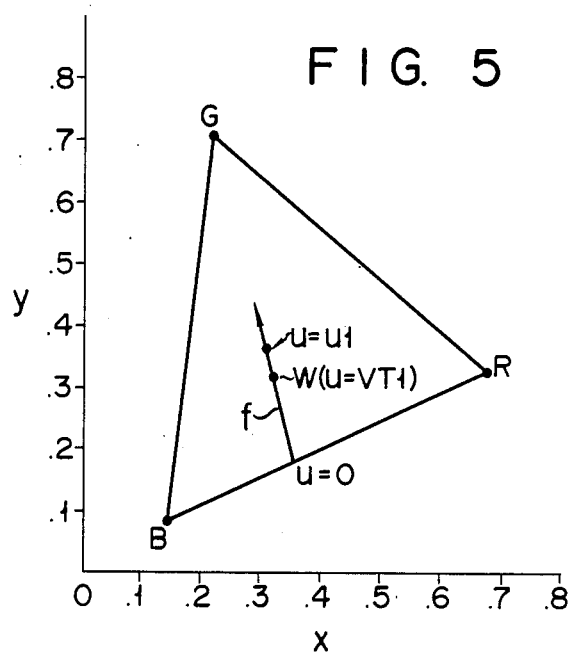
FIG. 5 shows a chromaticity diagram explaining the problem of the prior art, wherein the line f indicates a deviation in reference white of curve A in FIG. 4.

Unlike the current ratio of prior art given by equation (21), the current ratio of the present invention which is given by equation (33) is represented by line C in FIG. 4. Equation (33) is satisfied in all levels of the video signal, and hence the reference white is constant. This clearly demonstrates that no deviations from the reference white point W in FIG. 5 occur.

In the above description, the operation of the blue circuit is explained. The red and green circuits are operated in the same manner as in the blue circuit, thereby automatically controlling respective cathode driving voltages of R, G and B electron guns in CRT 21.

Although the above description is given to the case wherein the circuit of FIG. 6 operates according to the timing charts of FIGS. 7A to 7G, the circuit of FIG. 6 may be operated according to another way. For instance, as shown in FIGS. 10D to 10G, the second insertion pulse P2 is generated before the generation of first insertion pulse P1. Or, as shown in FIGS. 11D to 11G, the amplitude of second insertion pulse P2 may be smaller than that of first insertion pulse P1. Further, although not shown, the second insertion pulse P2 may be separated by two or more horizontal pulses HB from the first insertion pulse P1.

Figure 12:
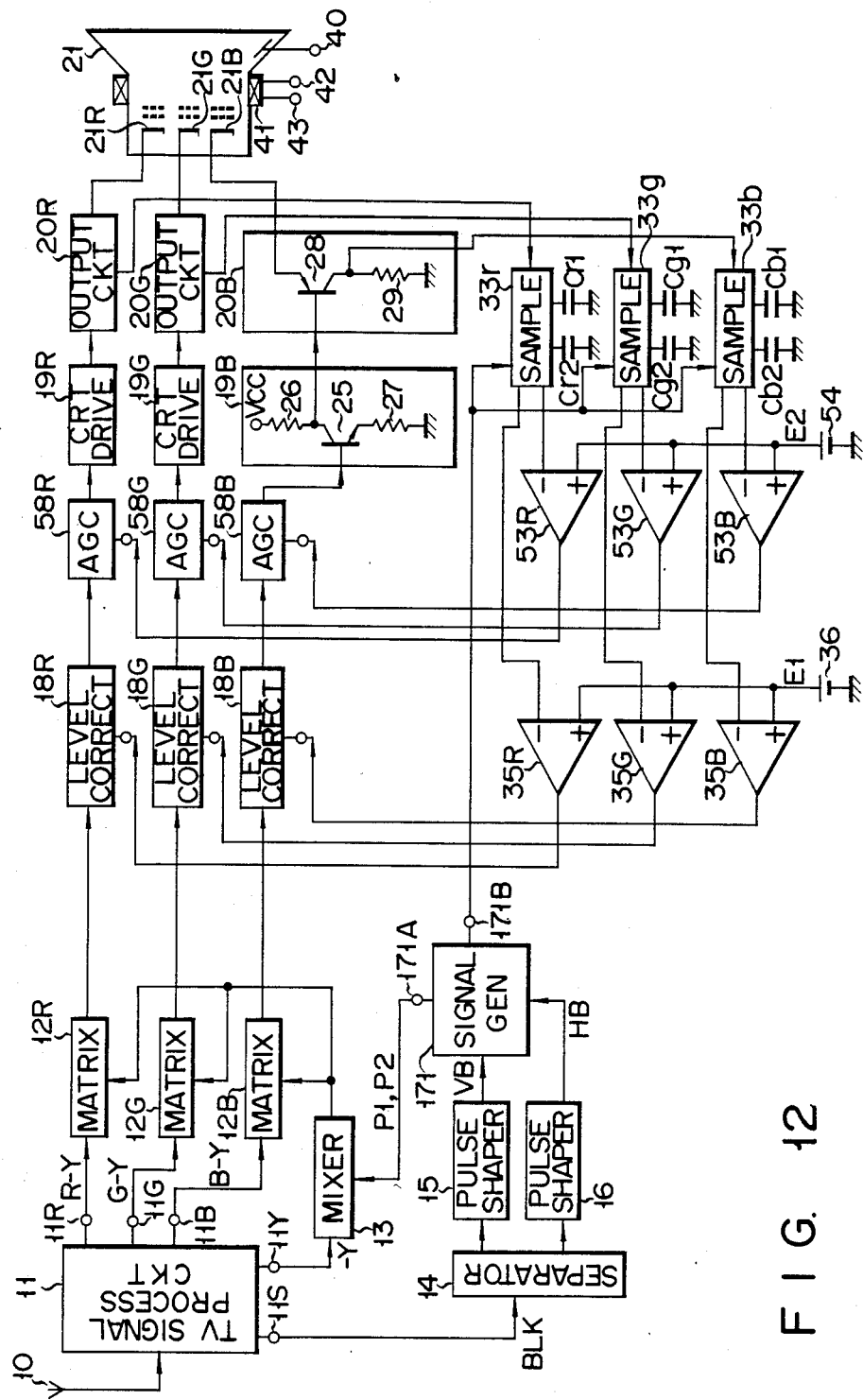
FIG. 12 shows a modification of the embodiment of FIG. 6.

The locations of AGC amplifiers 58R, 58G and 58B are not limited to those shown in FIG. 6. So long as substantially the same effect as in the embodiment of FIG. 6 is obtained, the AGC amplifiers may be inserted in any positions in the video signal transmission line. For instance, as shown in FIG. 12, AGC amplifiers 58R, 58G and 58B may be respectively inserted between level correction circuits 18R, 18G and 18B and CRT drivers 19R, 19G and 19B.

Figure 13:
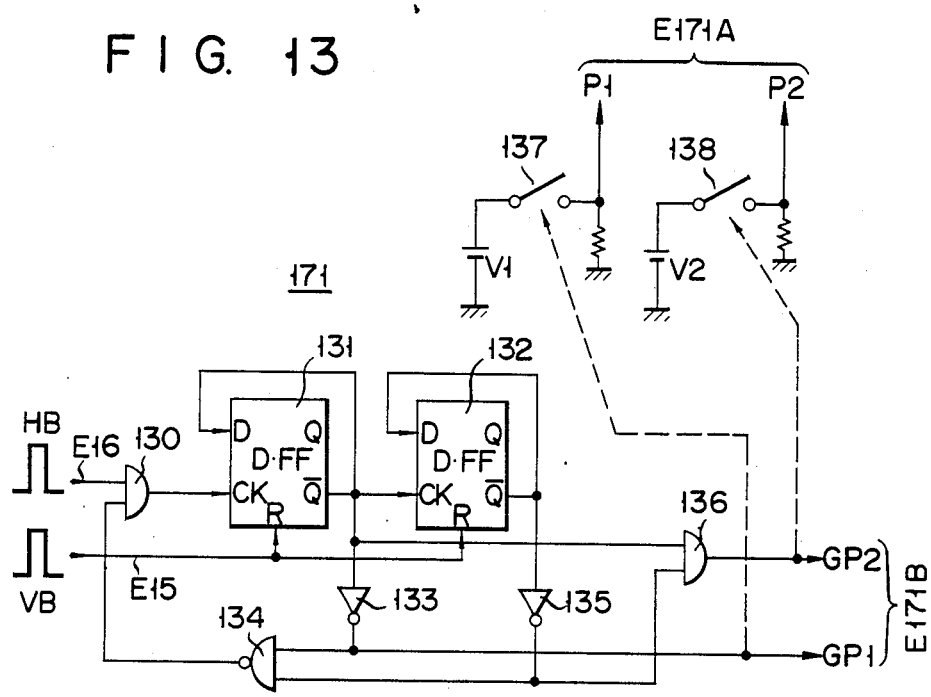
FIG. 13 shows a circuit diagram of signal generator 171 used in FIG. 6.

FIG. 13 shows a circuit example of signal generator 171 used in FIG. 6. Horizontal blanking pulse HB of signal E16 is supplied via one input of an AND gate 130 to the clock input CK of a D flip-flop 131. The D input of flip-flop 131 receives its inverted Q output. The inverted Q output from flip-flop 131 is supplied to the clock input CK of a D flip-flop 132 whose D input receives its inverted Q output. Each reset input R of flip-flops 131 and 132 receives vertical blanking pulse VB of signal E15. The inverted Q output from flip-flop 131 is supplied via an inverter 133 to one input of a NAND gate 134. The other input of gate 134 receives the inverted Q output of filp-flop 132 via an inverter 135. The NANDed output from gate 134 is supplied to the other input of AND gate 130. The inverted Q output from flip-flop 131 and the output from inverter 135 are respectively inputted to an AND gate 136. The output from inverter 133 is used as the first gate pulse GP1 (FIGS. 7E, 10E or 11E). The ANDed output from gate 136 is used as the second gate pulse GP2 (FIGS. 7F, 10F or 11F). Pulses GP1 and GP2 obtained from elements 133 and 136 constitute the gate pulse E171B.

The logical level of gate pulse GP1 from inverter 133 controls the on/off of an analog switch 137. When the level of pulse GP1 is high (FIG. 7E), switch 137 is closed so that a first insertion potential source V1 provides the high-level portion of first reference insertion pulse P1 (during T1 in FIG. 7D). When the level of pulse GP1 is low, switch 137 is opened so that pulse P1 disappears.

The logical level of gate pulse GP2 from AND gate 136 controls the on/off of an analog switch 138. When the level of pulse GP2 is high (FIG. 7F), switch 138 is closed so that a second insertion potential source V2 provides the high-level portion of second reference insertion pulse P2 (during T2 in FIG. 7D). When the level of pulse GP2 is low, switch 138 is opened so that pulse P2 disappears. Pulses P1 and P2 obtained from elements 137 and 138 constitute the reference insertion pulse E171A.

Figure 14:
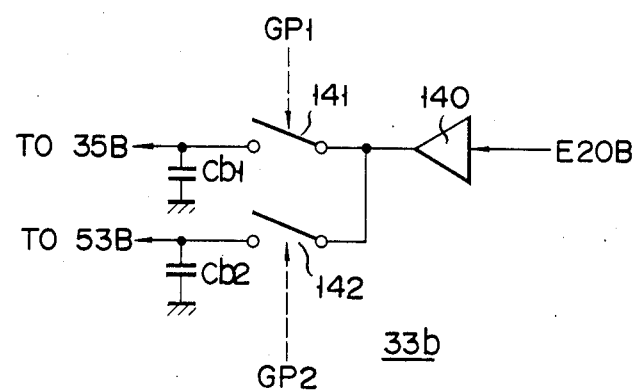
FIG. 14 shows a circuit diagram of sampling circuit 33b used in FIG. 6.

FIG. 14 shows a circuit example of sampling circuit 33b used in FIG. 6. The circuit configuration of 33r and 33g may be the same as that shown in FIG. 14. Signal E20B representing cathode current I21B of the B electron gun in CRT 21 is supplied via a buffer 140 to analog switches 141 and 142. The on/off of switch 141 is controlled according to the logical level of first gate pulse GP1. The on/off of switch 142 is controlled according to the logical level of second gate pulse GP2.

When switch 141 is closed by the high-level of pulse GP1, the potential of signal E20B, which indicates the magnitude of cathode current I21B at period T1 (FIG. 7D), is applied to capacitor Cb1. Then, capacitor Cb1 is charged by a voltage corresponding to the potential of signal E20B. The charged voltage (sampled potential) at capacitor Cb1 is supplied to comparator 35B. When the level of pulse GP1 is low, switch 141 is opened so that the charged voltage is held at capacitor Cb1.

When switch 142 is closed by the high-level of pulse GP2, the potential of signal E20B, which indicates the magnitude of cathode current I21B at period T2 (FIG. 7D), is applied to capacitor Cb2. Then, capacitor Cb2 is charged by a voltage corresponding to the potential of signal E20B. The charged voltage (sampled potential) at capacitor Cb2 is supplied to comparator 53B. When the level of pulse GP2 is low, switch 142 is opened so that the charged voltage is held at capacitor Cb2.

Figure 15:
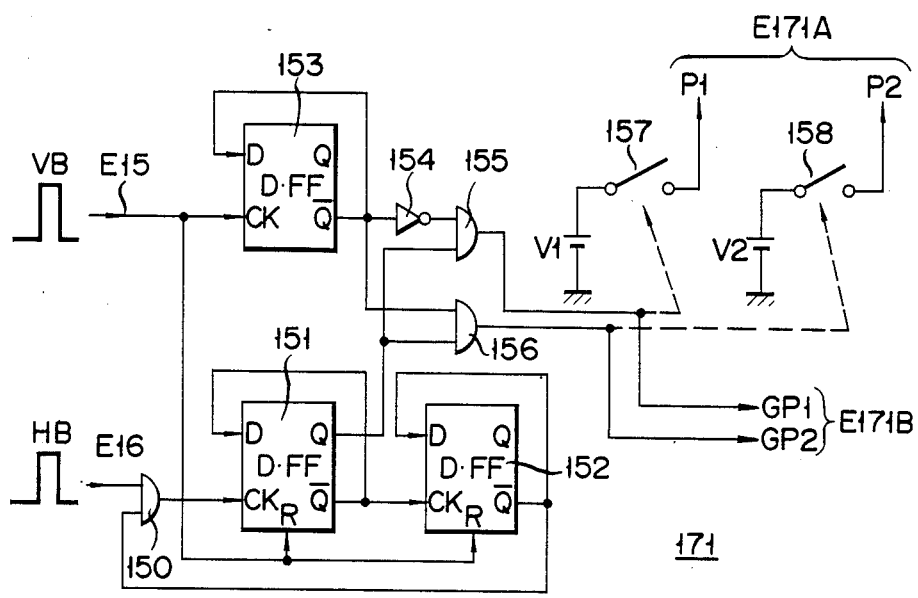
FIG. 15 shows another circuit diagram of signal generator 171 used in FIG. 6.

FIG. 15 shows another circuit example of signal generator 171 used in FIG. 6. Horizontal blanking pulse HB of signal E16 is supplied via one input of an AND gate 150 to the clock input CK of a D flip-flop 151. The D input of flip-flop 151 receives its inverted Q output. The inverted Q output from flip-flop 151 is supplied to the clock input CK of a D flip-flop 152 whose D input receives its inverted Q output. Each reset input R of flip-flops 151 and 152 receives vertical blanking pulse VB of signal E15. The inverted Q output from flip-flop 152 is supplied to the other input of AND gate 150. Signal E15 is supplied to the clock input CK of a D flip-flop 153 whose D input receives its inverted Q output. The inverted Q output from flip-flop 153 is supplied via an inverter 154 to one input of an AND gate 155. The other input of gate 155 receives the Q output from flip-flop 151. The ANDed output from gate 155 is used as the first gate pulse GP1. The inverted Q output from flip-flop 153 and the Q output from flip-flop 151 are inputted to an AND gate 156. The ANDed output from gate 156 is used as the second gate pulse GP2. Pulses GP1 and GP2 obtained from elements 155 and 156 constitute the gate pulse E171B.

The logical level of gate pulse GP1 from AND gate 155 controls the on/off of an analog switch 157. When the level of pulse GP1 is high, switch 157 is closed so that first insertion potential source V1 provides the high-level portion of first reference insertion pulse P1. When the level of pulse GP1 is low, switch 157 is opened so that pulse P1 disappears.

The logical level of gate pulse GP2 from AND gate 156 controls the on/off of an analog switch 158. When the level of pulse GP2 is high, switch 158 is closed so that second insertion potential source V2 provides the high-level portion of second reference insertion pulse P2. When the level of pulse GP2 is low, switch 158 is opened so that pulse P2 disappears. Pulses P1 and P2 obtained from elements 157 and 158 constitute the reference insertion pulse E171A.

Figure 16:
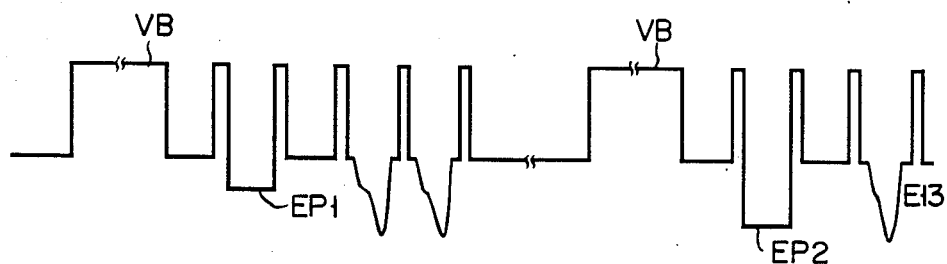
FIG. 16 shows a waveform of signal E13 obtained when the circuit of FIG. 15 is employed.

FIG. 16 shows a waveform of signal E13 obtained when the circuit of FIG. 15 is used with the configuration of FIG. 6. According to the circuit of FIG. 13, signal components EP1 and EP2 in video signal E13, which respectively correspond to first and second insertion pulses P1 and P2, appear in one vertical scanning period. On the contrary, according to the circuit of FIG. 15, only signal component EP1 corresponding to pulse P1 appears in a present vertical scanning period, and only signal component EP2 corresponding to pulse P2 appears in the next vertical scanning period. In other words, according to the circuit of FIG. 15, the DC negative feedback loop of elements 18 to 20, 33 and 35 (FIG. 6) is activated based on the component EP1 in one vertical scanning period, while the AC negative feedback loop of elements 58, 18 to 20, 33 and 53 (FIG.

6) is activated based on the component EP2 in the next vertical scanning period.

FIG. 17 shows another embodiment of the present invention. According to the embodiment of FIG. 17, application of excessive driving voltages to the respective cathodes of CRT 21 immediately after the power-on of the color television receiver can be prevented by the special circuit elements (51X to 57X). Since the CRT is protected from intermittent excessive driving at each time of power-on, the service life of the CRT is extended. In addition, a stable picture is reproduced on the CRT after the power-on of television receiver, thereby avoiding discomfort to the viewers. The special circuit elements 51X to 57X are disclosed in U.S. patent application No. 628,984 which was filed by the same applicant as the present application. All disclosures of this Japanese Patent Application No. 58-124607 are incorporated in the present application.

What is claimed is:

1. An automatic white control circuit for a color CRT provided with red, green and blue cathodes, comprising:

color signal source means for providing red, green and blue color signals;

amplitude/level controller means for controlling the amplitude of each of said red, green and blue color signals in accordance with given red, green and blue amplitude control signals, and for controlling the DC level of each of said red, green and blue color signals in accordance with given red, green and blue level control signals, thereby generating red, green and blue amplitude and level-controlled signals;

a CRT drive circuit for driving each of the red, green and blue cathodes of said color CRT in accordance with said red, green and blue amplitude and level-controlled signals;

current detector means for detecting a current of each of said red, green and blue cathodes, and for providing red, green and blue cathode current indicative signals;

pulse generator means for generating: (1) a first reference pulse having a first amplitude, (2) a second reference pulse having a second amplitude which differs from said first amplitude, (3) a first gate pulse generated in synchronism with said first reference pulse, and (4) a second gate pulse generated in synchronism with said second reference pulse;

a pulse insertion means for inserting said first and second reference pulses into each of said red, green and blue color signals;

means for sampling, in accordance with said first gate pulse, each signal level of said red, green and blue cathode current signals to provide red, green and blue DC level control potentials, and for sampling, in accordance with said second gate pulse, each signal level of said red, green and blue cathode current signals to provide red, green and blue amplitude control potentials;

first comparator means for comparing each of said red, green and blue level control potentials with a first given reference potential, and for providing said given red, green and blue level control signals, thereby forming DC negative feedback control loops for controlling each bias of the red, green and blue cathodes of said color CRT; and second comparator means for comparing each of said red, green and blue amplitude control potentials with a second given reference potential, and for providing said given red, green and blue amplitude control signals, thereby forming AC negative feedback control loops for controlling each amplitude of the red, green and blue cathode currents of said color CRT, wherein the automatic white control for said color CRT is effected by the operation of said DC negative feedback control loops, whose control targets are defined by said first given reference potential, and by the operation of said AC negative feedback control loops whose control targets are defined by said second given reference potential.

2. An automatic white control circuit according to claim 1, wherein the first amplitude of said first reference pulse is larger than the second amplitude of said second reference pulse.

3. An automatic white control circuit according to claim 1, wherein the second amplitude of said second reference pulse is larger than the first amplitude of said first reference pulse.

4. An automatic white control circuit according to claim 1, wherein said first reference pulse is generated after the generation of said second reference pulse.

5. An automatic white control circuit according to claim 1, wherein said second reference pulse is generated after the generation of said first reference pulse.

6. An automatic white control circuit according to claim 1, wherein said amplitude/level controller includes a level controller for adjusting said red, green and blue color signals based on said red, green and blue level control signals, so that each DC level of said red, green and blue color signals is converged to a value corresponding to said first given reference potential.

7. An automatic white control circuit according to claim 1, wherein said amplitude/level controller includes an amplitude controller for adjusting said red, green and blue color signals based on said red, green and blue amplitude control signals, so that each amplitude of said red, green and blue color signals is converged to a value corresponding to said second given reference potential.

* * * * *